(12) United States Patent
Schiel

(10) Patent No.: US 8,251,677 B2
(45) Date of Patent: Aug. 28, 2012

(54) BLOWER APPARATUS

(75) Inventor: Andreas Schiel, Gernsbach-Lautenbach (DE)

(73) Assignee: Robert Bosch GmbH, Stuttgart (DE)

( * ) Notice: Subject to any disclaimer, the term of this patent is extended or adjusted under 35 U.S.C. 154(b) by 630 days.

(21) Appl. No.: 12/306,164

(22) PCT Filed: Sep. 17, 2007

(86) PCT No.: PCT/EP2007/059792
§ 371 (c)(1),
(2), (4) Date: Dec. 22, 2008

(87) PCT Pub. No.: WO2008/055734
PCT Pub. Date: May 15, 2008

(65) Prior Publication Data
US 2009/0232645 A1    Sep. 17, 2009

(30) Foreign Application Priority Data
Nov. 9, 2006   (DE) .......................... 10 2006 052 812

(51) Int. Cl.
*F04B 39/06*    (2006.01)
(52) U.S. Cl. ........................ 417/372; 415/177
(58) Field of Classification Search .................. 415/177; 417/372
See application file for complete search history.

(56) References Cited

U.S. PATENT DOCUMENTS

| 2,436,322 A  * | 2/1948 | Mueller ........................... 310/58 |
| 5,401,145 A   | 3/1995 | Bleger et al. |
| 2004/0084992 A1 | 5/2004 | Finkenbinder et al. |

FOREIGN PATENT DOCUMENTS

| DE | 853 474 | 10/1952 |
| DE | 25 06 184 | 8/1975 |
| DE | 93 03 161 | 7/1994 |
| DE | 199 50 126 | 5/2000 |
| DE | 102 44 877 | 4/2003 |
| FR | 2 335 984 | 7/1977 |
| JP | 1-310199 | 12/1989 |
| JP | 11-344000 | 12/1999 |
| JP | 2003-111340 | 4/2003 |
| RU | 13732 | 5/2000 |
| SU | 661686 | 5/1979 |
| SU | 666613 | 6/1979 |
| SU | 667176 | 6/1979 |
| SU | 995210 | 2/1983 |
| SU | 1704235 | 1/1992 |

* cited by examiner

*Primary Examiner* — Anh Mai
*Assistant Examiner* — Andrew Coughlin
(74) *Attorney, Agent, or Firm* — Merchant & Gould P.C.

(57) ABSTRACT

The invention relates to a blower apparatus with an electric motor, which drives a blower wheel, is arranged in a motor housing and has a commutator with at least two brushes, which form in each case an associated brush bearing face with respect to the commutator, wherein a cooling air flow for cooling the electric motor is diverted into a cooling air channel of the motor housing by a blower air flow produced by the blower wheel. The invention is based on the object of designing the motor cooling system of the blower apparatus of the generic type in such a way that it is more efficient. The object is achieved by virtue of the fact that the cooling air channel has an air distributor, which splits the cooling air flow into at least two cooling air subflows, which are in each case supplied to one of the brush bearing faces directly and in targeted fashion.

10 Claims, 1 Drawing Sheet

BLOWER APPARATUS

TECHNICAL FIELD

The invention is based on a blower apparatus with an electrical motor that drives a blower wheel, which is arranged in a motor housing and which provides a commutator and at least two brushes that form in each case an associated brush bearing face with respect to the commutator, whereby a cooling air flow for cooling the electric motor is diverted into a cooling air channel of the motor housing by a blower air flow produced by the blower wheel.

BACKGROUND

These blower apparatuses are already mounted units of a blower motor, preferably a direct current motor, in a motor housing with or without retaining flange and a blower wheel that is arranged at a motor stub shaft as well as an integrated motor control unit, whereby all components are technically coordinated.

These blower apparatuses are for example used in heating-, ventilation- and air-conditioning systems as for air-conditioning the inside of a vehicle, whereby they are configured in different modules adjusted to the different client- and application-specific requirements. Thereby the development of the automotive engineering requires smaller and smaller modules with a higher blower power.

Such blower apparatuses use cooling air channels for cooling the electro motor, which are integrated into the motor housing. Usually one cooling air flow is internally branched off for the motor cooling from the blower air flow that is created by the blower wheel and lead to the motor with the aid of the cooling air channel. This leads the cooling air flow to a central point on the motor, so that based on that the components that are thermally loaded, such as the brushes of the commutator, the bearings and the magnetic circuit are equally circum-flowed and therefore to cooled down.

In order to achieve the necessary motor cooling a large amount of cooling air flow is required in the blower apparatuses of this type, which has to be branched off from the blower air flow. That requires a large cooling air channel, which is opposed to the efforts for space-saving on the one hand. On the other hand the branched off cooling air flow influences the pressure drop in the blower apparatus negatively and finally decreases the blower power.

Therefore it is the task of the invention to configure the motor cooling of the blower apparatus of this type more efficiently.

SUMMARY

The task is thereby solved, in that the cooling air channel provides an air distributor, which divides the cooling air flow in at least two cooling air subflows, which are each directly and targeted supplied to one of the brush bearing faces.

The invention is thereby based on the understanding that the critical places in the direct current motor are thermally the brushes of the commutator, which therefore have the highest percentage of the developed motor heat. The winding of the rotor is connected over the brushes (contacts) of the commutator with the electric supply. The brush bearing faces of the brushes abut in direct contact at the rotor winding and grind over the rotor winding during the rotor rotation, while the commutator constantly changes the polarity of the rotor winding. The brushes consist of a well conducting material and rub down during operation. Due to the rubbing the brush bearing faces get extremely hot especially at high engine speed as they occur at motors for the blower drive. According to the implementation of the cooling air channel of this invention the brush bearing faces are targeted and equally cross-flowed by the directed cooling air subflows. The concentrated lead of the cooling air subflows to the brushes that provide the highest temperature difference to the cooling air flow provides for a very good heat transfer. Therefore the motor heat that is created there is better led away, which enables to reduce the cooling air flow that has been used for this purpose. In doing so the motor cooling is consequently configured very efficiently.

The lead of the cooling air subflows takes place specifically aimed, when the cooling air channel provides at least two guide flanks in the direction of the current subsequent to the air distributor, with which one cooling air subflow can be directed towards the brush bearing faces. In doing so the cooling air subflow can be diverted from one direction of the current that has been randomly preset by the position of the of the cooling air channel and be concentrated on the brush bearing faces compactly bundled.

The cooling air channel, the air distributor and/or the guide flanks are preferably at least partially arranged in a housing cover of the motor housing. Since the housing cover of the motor housing is usually arranged in the area of the commutator the constructive effort can be therefore minimized for example regarding the necessary channel length of the cooling air channel for reaching the brushes of the commutator.

If the housing cover is furthermore detachably connected with the motor housing, the housing cover can be easily exchanged with the integrated cooling air channel. In a variable embodiment of the housing cover, for example regarding the size and the form if the integrated cooling air channel, this housing cover can be modularly configured and used with the cooling air channel for different applications of the electro motor that is provided in the blower apparatus.

The constructive effort for the cooling air channel is further minimized when the cooling air channel is build trilaterally by the housing cover and open on the channel side that is directed towards the commutator. Only a small part of the cooling air flow or the cooling air subflow detaches hereby from the main flow direction along the trilaterally closed cooling air channel and is extensively supplied to the motor housing for cooling the motor. The main part of the cooling air flow is divided by the air distributor according to the invention and the cooling air subflows is subsequently targeted diverted by the guide flanks.

BRIEF DESCRIPTION OF THE DRAWINGS

The blower apparatus according to the invention is explained in the following by an embodiment, which is in addition schematically shown in the corresponding drawings. It is shown.

DETAILED DESCRIPTION

Figure 1:
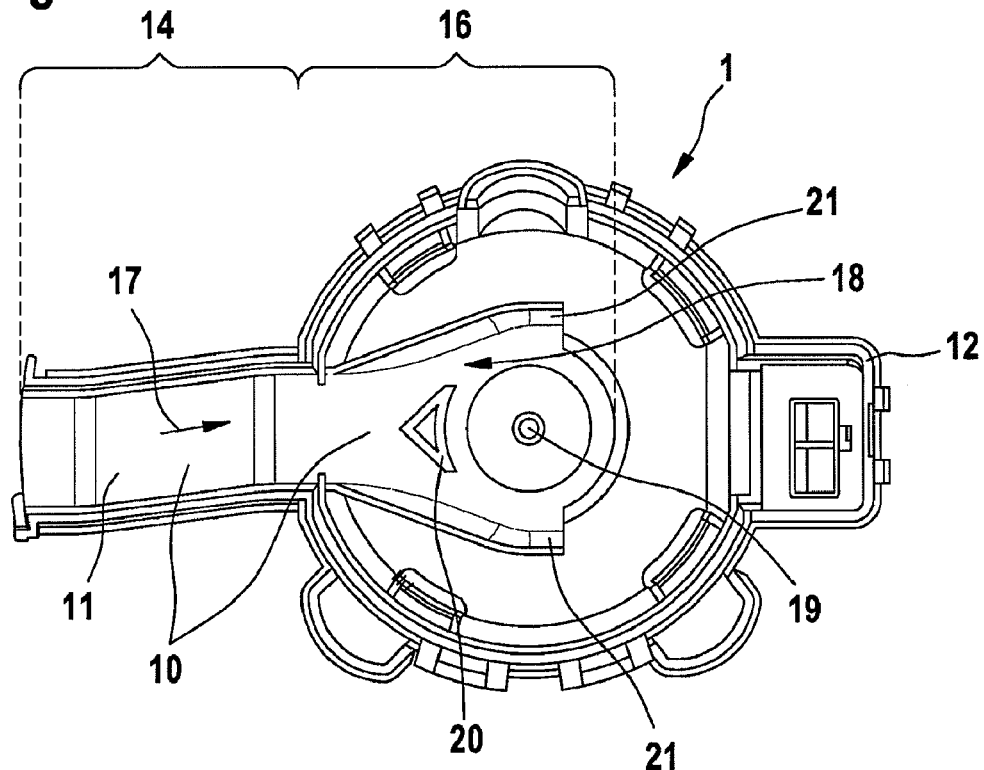
FIG. 1 is a plan view on to the inside of a detachable housing cover of the motor housing of the blower apparatus according to the invention.
Figure 2:
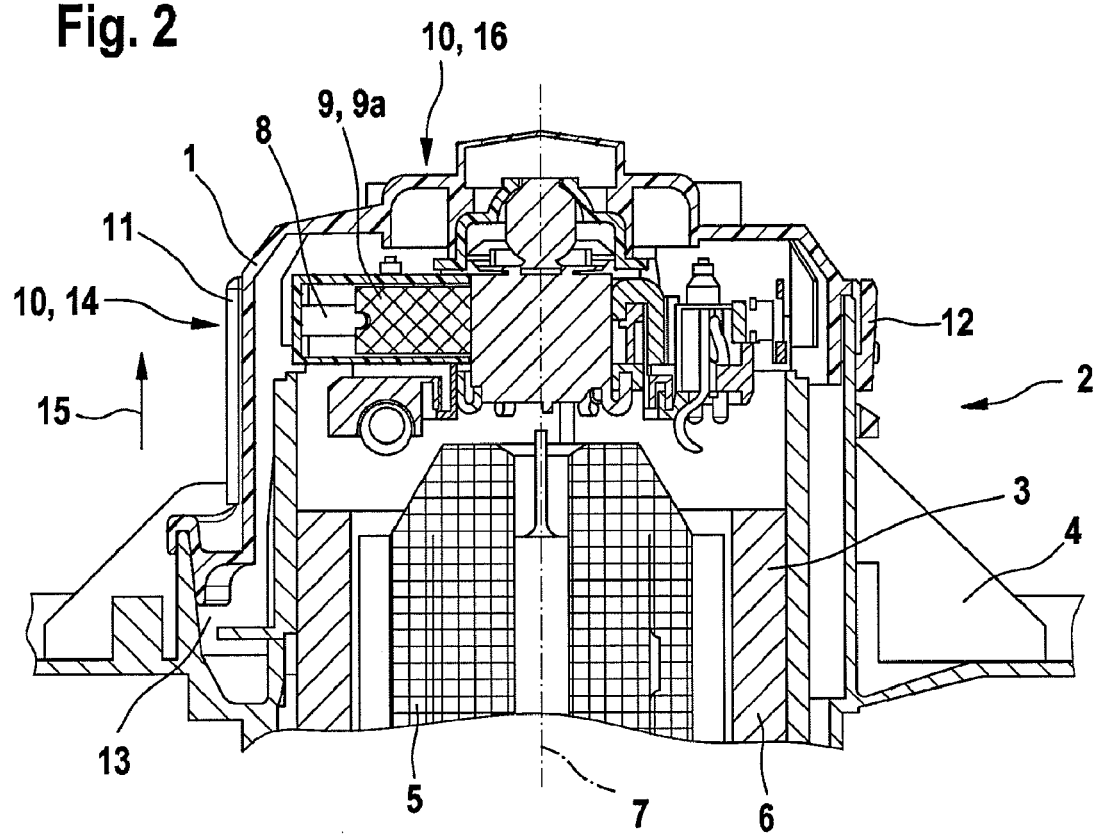
FIG. 2 is a longitudinal section in extracts through the motor housing of the blower apparatus according to the invention

FIG. 1 shows the housing cover 1 of the motor housing 2 of the blower apparatus according to the invention that is apparent from FIG. 2 in a position that is detached from the motor housing 2, in which the inside of the housing cover 1 can be looked at. (The housing cover 1 is shown downscaled towards the dimensions of the motor housing 2).

The motor housing 2 that is closed with the housing cover 1 according to FIG. 1 is apparent from the longitudinal section in extracts through the motor housing 2 of the blower apparatus of FIG. 1 according to the invention. The cross-sectional view shows a part of the motor housing 2 with a direct current motor 3 that is located in it and that drives a blower wheel. The blower wheel is not shown because it is dispensable for the illustration of the invention. At the outer scope of the motor housing 2 the blower apparatus has a retaining flange 4 for attaching the blower apparatus in a not shown ventilation system. The direct current motor 3 is equipped with a rotor 5, which is surrounded by a stator 6 and is rotating around a rotor shaft 7. In the extension of the rotor shaft 7 turned towards the housing cover 1 a commutator 8 is arranged with two brushes 9 opposing each other in pairs with brush bearing faces 9a. Also not shown in this cross-sectional view is a stub shaft of the rotor 5, which stands out of the motor housing 2 in the extension of the rotor axis 7 and turned away the housing cover 1. The blower wheel is connected with this stub shaft.

A cooling air channel 10 is integrated in the housing cover 1 according to FIG. 1. (apparent in FIG. 2). The housing cover 1 provides two grounding clips 11, 12, which are opposed to each other and with which the housing cover 1 is attached at the motor housing 2 in a closed status. These grinding clips 11, 12 are thereby flexible and adjust to the external contour of the motor housing 2 for attaching the housing cover 1. One of the grinding clips 11 is stretched alongside and develops in a closed status of the motor housing 2 together with an external contour of the motor housing 2 an inlet air opening 13 with a first section 14 of the cooling air channel 10, with whose aid the cooling air flow is branched off the blower air flow and supplied to the motor housing 2. The arrow in FIG. 2 shows the direction of the current 15 of the branched off cooling air flow in the first section 14 of the cooling channel 10. A second section 16 of the cooling channel following the direction of the current 15 is formed at the inside of the housing cover 1 and runs orthogonally to the first section 14 in closed status of the motor housing 2 and therefore orthogonally to the rotor axis 7. This second section 16 of the cooling air channel 10 is build trilaterally by the housing cover 1 and is open on the channel side that is turned to the commutator 8. The trilateral cooling air channel 10 widens gradually along a direction of the current 17 of the cooling air flow in the second section 16 of the cooling air channel 10 and terminates with a closure 18, whereby it surrounds a center point 19 of the housing cover 1, which lies on the rotor axis 7 in closed status of the motor housing 2.

An air distributor 20 divides the cooling air flow in the second section 16 of the cooling air channel 10 into two cooling air subflows before reaching the center point 19 of the housing cover 1, so that the cooling air flow is not supplied to a central point on the direct current motor but being divided is directly and targeted supplied to the brushes 9 of the commutator 8 with the brush bearing faces 9a that are opposed to each other in pairs. Two guide flanks 21 that are angled away from the direction of the current 17 lead each a cooling air subflow targeted to the brush bearing faces 9a of the brushes 9. With the aid of these guide flanks 21 each cooling air subflow is bundled and redirected by ca. 90° in a current direction that is basically parallel to the rotor axis 7. Therefore each cooling air subflow is aimed directly from above and concentrated to one of the brush bearing faces 9a. These embodiments of the cooling air channels 10 result in the pre-described advantageous effects.

The invention claimed is:

1. A blower apparatus, comprising:
an electric motor that drives a blower wheel, wherein the electric motor is arranged in a motor housing and has a commutator with at least two brushes that form in each case an associated brush bearing face with respect to the commutator; and
a cooling air channel, wherein a cooling air flow for cooling the electric motor is diverted into the cooling air channel of the motor housing by a blower air flow produced by the blower wheel, and wherein the cooling air channel has an air distributor that splits the cooling air flow into at least two cooling air subflows, each cooling air subflow supplied directly and is targeted to one of the at least two brush bearing faces, the cooling air subflows being directed towards the brush bearing faces by a pair of guide flanks provided on a closure of the cooling air channel, wherein the guide flanks are angled toward a direction of flow of the cooling air stream deflect a cooling air partial stream at about an angle of 90 degrees into a direction of flow which runs substantially parallel to a rotor axis of the electric motor such that each cooling air subflow is directed from above onto one of the brush contact surfaces.

2. The blower apparatus of claim 1, wherein the cooling air channel is provided with the guide flanks oriented in a direction of air current of the cooling air channel and positioned at least partially upstream of the air distributor, thereby one cooling air subflow can be directed towards one of the at least two brush bearing faces.

3. The blower apparatus of claim 1, wherein at least one of: the cooling air channel; the air distributor; and the at least two guide flanks are at least partially arranged in a housing cover of the motor housing.

4. The blower apparatus of claim 3, wherein the housing cover is detachably connected with the motor housing.

5. The blower apparatus according to claim 1, wherein the cooling air channel is trilateral and formed trilaterally by the housing cover and open on a channel side that is turned towards the commutator.

6. The blower apparatus according to claim 1, wherein the closure is drop shaped and the cooling air channel gradually widens toward the closure along a direction of flow of the cooling air stream.

7. The blower apparatus according to claim 1, wherein the cooling air channel comprises a first section and a second section, wherein the first section is disposed in the motor housing and the second section is disposed on an inside of the housing cover such that, in a closed state of the housing cover, the second section runs perpendicularly with respect to the first section.

8. The blower apparatus according to claim 7, wherein the second section of the cooling air channel is formed on three sides from the housing cover and is open on a duct side facing the commutator.

9. The blower apparatus according claim 1, wherein the closure of the cooling air channel encloses a center point of the housing cover that lies on a rotor axis of the electric motor when the motor housing is in a closed state.

10. The blower apparatus according to claim 1, wherein the air distributor divides the cooling air flow into two cooling air subflows in a second section of the cooling air channel upstream of the a center point of the housing cover to prevent the cooling air stream from being guided onto the electric motor at a central point.

* * * * *